United States Patent [19]

Winstead

[11] 4,413,964
[45] Nov. 8, 1983

[54] APPARATUS FOR THE CONTINUOUS FORMATION OF BI-AXIALLY ORIENTED THERMOPLASTIC MATERIALS

[75] Inventor: Thomas W. Winstead, Baltimore, Md.

[73] Assignee: Maryland Cup Corporation, Owings Mills, Md.

[21] Appl. No.: 154,369

[22] Filed: May 29, 1980

Related U.S. Application Data

[62] Division of Ser. No. 886,160, Mar. 13, 1978, Pat. No. 4,250,129.

[51] Int. Cl.$^3$ .............................................. B29D 7/02
[52] U.S. Cl. ...................................... 425/66; 425/161; 425/326.1; 425/388; 425/453
[58] Field of Search ...................... 425/326.1, 388, 66, 425/217, 453; 264/553

[56] References Cited

U.S. PATENT DOCUMENTS

| | | | |
|---|---|---|---|
| 2,490,781 | 12/1949 | Cloud | 264/289 |
| 2,689,378 | 6/1954 | Muth et al. | 425/387.1 |
| 3,479,699 | 11/1969 | Winstead | 425/66 |
| 3,632,266 | 1/1972 | Winstead | 425/388 |
| 3,676,537 | 7/1972 | Winstead | 264/522 |
| 3,807,004 | 4/1974 | Anderson | 264/290.2 |
| 3,833,973 | 9/1974 | Schwarz | 264/290.2 |
| 3,836,309 | 9/1974 | Thiel | 425/388 |
| 3,837,782 | 9/1974 | Meissner et al. | 425/388 |
| 3,901,638 | 8/1975 | Yoshikawa et al. | 425/326.1 |
| 3,904,338 | 9/1975 | Straumanis | 425/171 |
| 3,954,368 | 5/1976 | Kawakami | 425/326.1 |
| 4,068,998 | 1/1978 | Attucci et al. | 425/387.1 |
| 4,234,536 | 11/1980 | Thiel et al. | 264/290.2 |
| 4,235,579 | 11/1980 | Kurz et al. | 425/342.1 |
| 4,250,129 | 2/1981 | Winstead | 264/210.1 |
| 4,288,400 | 9/1981 | Winstead | 264/210.1 |
| 4,307,049 | 12/1981 | Winstead | 264/37 |

Primary Examiner—Jay H. Woo
Attorney, Agent, or Firm—Birch, Stewart, Kolasch & Birch

[57] ABSTRACT

An apparatus for continuously extruding, biaxially orienting and forming molded products from a web of thermoplastic material and further, continuously separating the products from the web selvage, stacking and handling the products and recycling the web selvage for further extrusion. The apparatus use continuous molding devices, namely, multiple mold cavities in a rotating polygon configuration over the peripheral surface of which the biaxially oriented web is securely and continuously positioned by a follower roller interfacing the polygon with a biaxial orientation device. Continuous and immediate interfacing is effected to prevent loss of orientation in the web which is kept at a temperature suitable for ingestion thereof into the mold cavities by vacuum, pressure or plug assist. In one preferred embodiment the inertia at the interface between the undulating peripheral surface of the rotating mold polygon and biaxial orientation apparatus is reduced to an optimal minimum.

30 Claims, 10 Drawing Figures

APPARATUS FOR THE CONTINUOUS FORMATION OF BI-AXIALLY ORIENTED THERMOPLASTIC MATERIALS

This application is a divisional, of copending application Ser. No. 886,160, filed on Mar. 13, 1978 now U.S. Pat. No. 4,250,129.

FIELD OF THE INVENTION

This invention relates to apparatus for biaxially orienting thermoplastic materials such as polystyrene and more particularly, to a continuous method and apparatus for manufacturing such material and uninterruptedly forming objects therefrom.

BACKGROUND OF THE INVENTION

The specifics of the following discussion and specification refer to oriented polystyrene material, hereinafter referred to as OPS but it should be expressly understood that the process and apparatus constituting the present invention are applicable to a wide variety of thermoplastic materials, polymers or mixtures of polymers including such materials as polymers of ethylene, polypropylene, styrene, vinyl chloride, etc.

While individual materials have problems which are often peculiar to those materials and hamper commercial exploitation of them, the polystyrene materials exhibit low-cost, high stiffness and excellent transparency when properly oriented and the proper molecular orientation further enhances the polystyrene material by removing its inherent brittleness in the absence of molecular orientation.

There are various prior art approaches to mitigating the brittleness factor in polystyrene materials, by the use of impact modifiers and the like. However, this decreases the stiffness, eliminates transparency and increases the cost significantly.

Therefore, prior art approaches to remedy the brittleness problem and increase the impact resistance of polystyrene result in certain undesirable properties which did not exist prior to the addition of such modifiers.

Accordingly, if such materials could be used in a relatively unmodified state in manufacturing sheets or strips of this material in a continuous extruding process in which continuous biaxial orientation is imparted to this material and then, without destroying the continuity of the process, molded articles or otherwise formed articles are produced therefrom, all of the desirable physical properties of the material could be realized. At the same time all of the desirabilities, speed and efficiencies of a fully continuous process could be realized in the ultimate product cost.

This integrated approach which combines continuous extrusion, orientation and forming in rapid succession is the crux of the present invention.

Heretofore, the conventional approaches such as with foam sheet materials and non-foamed or non-cellular sheet materials has been to first produce sheeting, store it in rolled form and terminate the initial process at that point. Then, subsequently, the sheeting is unrolled, reheated and subsequently formed into products or articles in its reheated state. As with all thermoplastic techniques, there are three basic interrelated variables involved in processing thermoplastic materials which affect both the nature of the operation and the characteristics of the final product. These variables are temperature, time and physical state, with the latter variable dealing with pressure, stress, etc.

As a general rule, temperature and time should be minimized variables because extended heat history can materially affect the properties of an end product. In the case of OPS, for example, the temperature at which the material must be oriented represents a compromise between levels which are best from a flow point of view and levels which are best from a stress (orientation) point of view. Once a stress is imposed at a given temperature, for example, a molecular orientation is achieved. However, the longer the increment of time involved between the achievement of that orientation and a subsequent operation, the more the stress (orientation) will be relaxed or lost. Accordingly, the degree of orientation of a particular material is not necessarily a sole function of the amount of heat stretching applied to that material to create the orientation since relaxation of that orientation may simultaneously be taking place.

Therefore, a high speed, integrated approach is unique and important not only from a standpoint of cost but also from the standpoint of results heretofore not otherwise attainable.

These inherent advantages of a high speed integrated approach are important in relatively thin products such as those with wall thicknesses of 0.005 to 0.010 inches and become increasingly significant with products having wall thicknesses greater than 0.010 inches. This is due to the fact that conventional systems as heretofore defined, necessarily involve not only greater time/temperature exposure during the production of heating from which the ultimate products are formed, but also involve the reheating and subsequent recooling of the sheet during the subsequent forming operation. Accordingly, the relief of stress occurs during reheating and subsequent recooling as well as during a possible relaxation during the production of the sheeting per se.

Theoretically, the ideal process would be to biaxially orient the thermoplastic material, form and cool it simultaneously. In conventional systems, the time factor is significant and therefore detrimental. Accordingly, the shorter the time factor the less detrimental the effect thereof on the maintenance of a stressed or oriented condition of the material.

Of the conventional methods employed for the production of articles made from material which is biaxially oriented, perhaps the most popular and widely used prior art system involves the extrusion of a sheet from a slot die onto a roll, the temperature of the said roll being controlled, and then through a series of additional rolls which first bring the sheet to an appropriate temperature level for orientation and then longitudinally stretch the sheet between two rolls running at different speeds. This longitudinal stretching or drafting orients the material in the machine direction. The material with the longitudinal orientation is then passed onto a tenter frame to orient it transversely in a manner well-known in the art. Since conventional tentering involves large, heavy equipment, it is also necessary that temperatures be maintained in the sheeting through the use of large, expensive ovens. After the sheeting has been oriented both longitudinally and transversely, it is then rolled and stored for subsequent use.

The forming of OPS sheeting is usually carried out on non-rotating thermoforming equipment with special provisions for the OPS material. It is necessary that the reheating of the sheeting as it is fed into the forming equipment be maintained uniformly throughout its width and length. As the material reaches a satisfactory forming temperature, the stretches which have been imposed during the biaxial orientation must be maintained by adequate clamping devices in order to preclude the sheet from shrinking back to its original dimensions and losing the orientation therein.

Since most non-rotary forming equipment is necessarily intermittent in its operation. the intermittent feeding of oriented sheet in such conventional forming equipment imposes inherent difficulties in the creation and maintenance of uniform temperature conditions throughout the forming area of the sheet.

There are several other approaches which have been used to some extent in the production of biaxially oriented sheeting. One of these, the bubble process, is typically the way much thermoplastic film is produced. By proper control of temperature and stretching, it is possible to produce a biaxially oriented film or sheet using this bubble technique. However, in practice it is proven to be very critical because of temperature uniformity requirements. Also this technique is not usable when it comes to thicker material such as that used in thermoformed articles or products on the order of meat trays, containers and tableware.

Further, there is some equipment in use which simultaneously stretches transversely and longitudinally. This equipment obviates the use of longitudinal stretching rolls such as those previously described, but it has certain disadvantages, namely, the amount of selvage which must be discarded due to the increased scalloped effect resulting from clamps which are necessarily moved further apart in the longitudinal direction in order to achieve such a simultaneous biaxial stretching action.

The molecular orientation of thermoplastic materials, as previously indicated, results in significant improvements in many of the characteristics of certain of these materials. Biaxial orientation is essential in most packaging and disposable products. If orientation is only in one direction, even though properties may be substantially improved in that direction, they are reduced in the other dimensions. Typical of products which are oriented in one direction only are monofilaments and fibers. During orientation, the molecules in the material are shifted from random coil entanglement to a relative alignment parallel to principal axes of stretch. This results in significant improvements in physical properties, optical properties and in improved barrier properties and stress crack resistance.

For example, among the physical property improvements, the impact strength in materials such as OPS are improved on the order of ten times with two to three times the tensile strength of non-oriented polystyrene and as much as three times the improvement in yield elongation.

It is therefore an object of the present invention to provide a new and novel method and apparatus for forming thermoplastic products by continuous extrusion, orientation and forming in rapid succession in an integrated system.

Yet another object of the present invention is to provide a new and novel thermoplastic product forming method and apparatus which extrudes, biaxially orients and forms thermoplastic products and minimizes, to an optimum degree, the time lag between the extrusion, orientation and forming stages thereof.

Yet another object of the present invention is to provide an integrated method and apparatus for forming biaxially oriented thermoplastic products in a continuous extrusion, orientation and forming process which achieves higher basic linear speeds than has heretofore been accomplished.

Yet another object of the present invention is to provide a method and apparatus for thermoforming biaxially oriented thermoplastic products of enhanced quality.

These and other objects of the present invention will become more fully apparent with reference to the following specification and drawings which relate to several preferred embodiments of the present invention.

SUMMARY OF THE INVENTION

The process of the present invention commences with the continuous extrusion of a relatively narrow strip of thermoplastic material from a die at a relatively high linear speed and which is extruded at the preferred orientation temperature. If the extrusion temperature is above the desired orientation temperature then it may be passed over cooling rolls in order to bring it down to the desired orientation temperature. The strip is then passed through differential speed rolls, if desired, to impart a predetermined maximum or partial amount of longitudinal or machine direction stretch orientation thereto and immediately subsequent to this orientation is passed into a transverse stretching station which consists basically of a pair of divergently disposed rotating saw blade like devices which engage the strip along each edge and divide it into a series of increments which are then continuously separated transversely to a distance of approximately three times the original dimension of the extruded strip.

Since the longitudinal direction is also desirably oriented by stretching on an order of magnitude of three times the original dimension, if this has not been achieved by the stretching rolls upstream from the transverse stretching mechanism, the balance of the longitudinal stretching may be taken care of downstream from the transverse stretching apparatus. All of the foregoing steps, however, are performed on a continuous and uninterrupted basis.

After the proper degree of orientation has been biaxially imparted to the extruded and now lengthened and widened strip of material, the material is continuously transferred onto the perimeter of a rotating polygon mold, each segment of which contains a forming cavity and retention devices to hold the stretched sheet to its new dimensions at the point of transfer.

The sheet is then thermoformed into the mold cavities on the rotating polygon sequentially and is chilled against the mold surface below the distortion point of the oriented sheeting to thereby set the material and retain the orientation therein.

Downstream from the rotating polygon mold device is a continuous and sequential severing apparatus which continuously and sequentially severs the formed articles from the selvage and then accumulates the articles for stacking and packaging while gathering the selvage for reuse. The selvage is reused by recycling it to the raw material processor which includes a device for admixing thermoplastic pellets and chopped up selvage.

In order to enhance the operation and the quality control, the biaxial orientation equipment must be physically engaged, in some part, at its output point with the rotating polygon mold means and therefore, problems of inertial interaction between these two devices have been noted. The present invention includes new and novel means for precluding the full inertial effect from taking place and includes a structure which in fact minimizes, to an optimum degree, the equipment inertia present at the mold-orientation equipment interface to thereby preclude uneven longitudinal stresses from being imparted to the material because of this inertial problem at the interface.

DETAILED DESCRIPTION OF THE DRAWINGS

Figure 1:
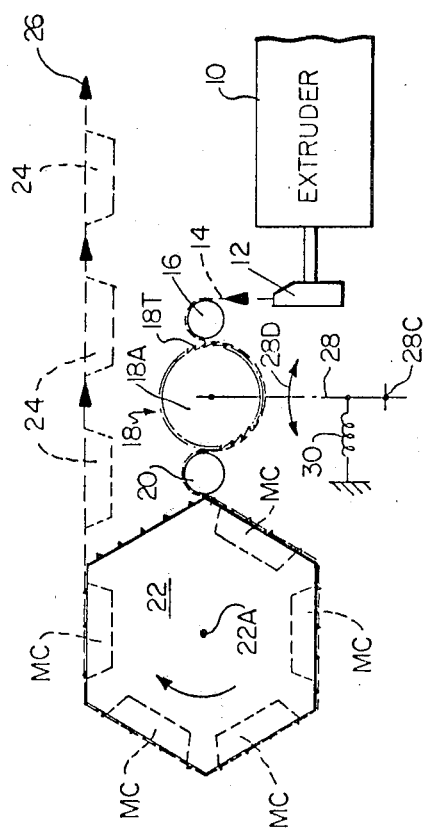
FIG. 1 is a schematic of a continuous extrusion, biaxial orientation and forming system wherein the extrudate is extruded at orientation temperature.

Referring in detail to the drawings and with particular reference to FIG. 1, an extruder 10 is illustrated as having an output to a die 12 which forms a narrow web 14 of polystyrene or other thermoplastic extrudate at a temperature approximating the optimum temperature for subsequent biaxial orientation of the extrudate 14.

From the die 12, the web-like extrudate 14 is shown as passing over an input roller means 16, beneath a transverse stretcher blade assembly 18, and subsequently, over an output roller assembly 20, the latter being juxtaposed with the periphery of a mold wheel assembly 22 which is of polygonal cross-sectional shape and which is rotated about a central axis 22A. The web of extrudate 14 passes beneath the mold wheel 22 which rotates clockwise as shown in the drawing. Each flat on the periphery of the mold wheel 22 includes a mold cavity MC, a plurality of which are shown in dotted lines in FIG. 1.

Suitable vacuum means or a combination of positive pressure, vacuum and/or male die members are provided to cooperate with the mold cavities MC to form predetermined shapes corresponding to those initially imparted to the mold cavity in the web 14 and these products 24 are schematically shown in cross-section leaving the uppermost portion of the mold wheel 22 and passing in a reverse direction back over the extruder 10 as illustrated by the directional arrow 26.

The rotational velocity of the input roller assembly 16 relative to the transverse stretching blade assembly 18 may be set differentially to impart a longitudinal stretch or a machine direction stretch to the web 14 and a similar differential rotational velocity between the peripheries of the output roller assembly 20 and the transverse stretcher blade assembly 18 may also be provided to impart additional machine direction stretch or orientation to the web 14.

Figure 5A:
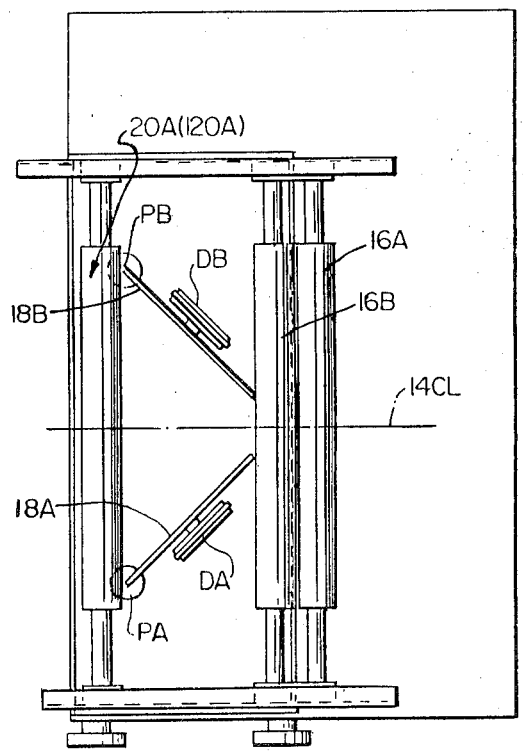
FIG. 5A is a top plan schematic illustrating the transverse stretching blades of the present invention set at maximum divergence.
Figure 5B:
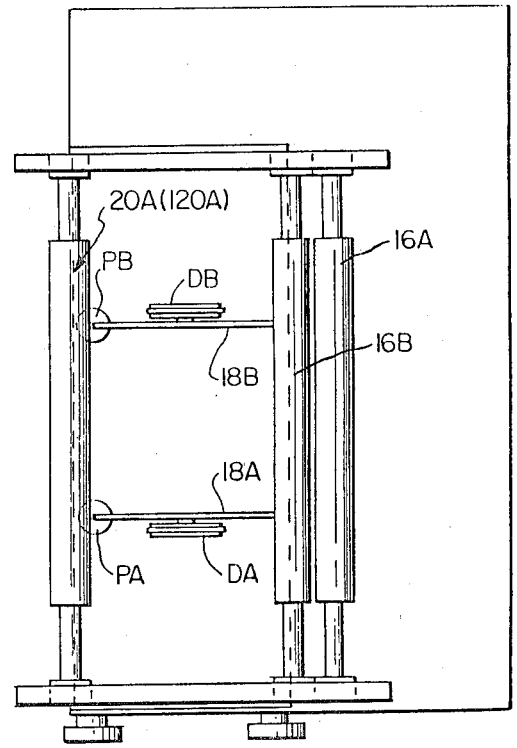
FIG. 5B is a top plan schematic illustrating the transverse stretching blades of the present invention set at minimum divergence (mutually parallel)

The transverse stretcher blade assembly 18 is best illustrated by joint reference to FIGS. 1, 5A and 5B in which the transverse stretcher blade assembly 18 is illustrated as including first and second circular saw blades 18A and 18B, respectively, which are mounted on downstream pivots PA abd PB, respectively, which in turn, are suitably mounted by any well-known means on a machine frame such that the saw blades 18A and 18B are adjustable about the pivot means PA and PB between a maximum divergence of 45° to the machine direction or product center line illustrated in FIGS. 5A and 5B as product center line 14CL and which are driven about central blade axes by means of drive pulleys DA and DB which are also positioned for movement with the blades 18A and 18B about the said respective pivot means PA and PB.

The teeth 18T about the periphery of each blade engage the outermost edges of the web 14 and cause it to change from its initial extruded dimension at the input side of the blades to a much wider dimension commensurate with the divergence at which the blades are set at the output side thereof. In this manner, a transverse orientation is imparted to the web 14 in a continuous manner as it traverses the transverse orientation blade assembly 18 from the input roll assembly 16 to the output roll assembly 20.

In the schematic of FIG. 1, the entire assembly of the input rollers 16, transverse orientation rollers 18 and output rollers 20 is a unitary structure mounted on a common vertical post which is schematically illustrated at 28 and which post 28 is biased by suitable means 30 such that the output roller assembly 20 closely follows the peripheral contours of the polygon shaped mold wheel 22.

As a result, the oscillation of the vertical support 28 about its center point 28C occurs as shown by the arcuate arrow 28D in FIG. 1.

Therefore, if the speed of the mold wheel 22 is increased to a point where production speeds of a highly desirable level are obtained, the inertial forces in the combined integrated input-transverse orientation-output roll assembly 16-18-20 are such that the roller assembly 20 at the output will not properly follow the contour of the mold wheel 22 and will place uneven longitudinal stresses in the biaxially oriented material, resulting in inferior products and in some cases, an improper alignment on the mold wheel 22. This results, of course, in products which are inferior and which defy efforts to provide satisfactory quality control. At slower speeds, however, the continuity of the method and apparatus of FIG. 1 provides a highly desirable process with high quality end products 24.

Figure 2:
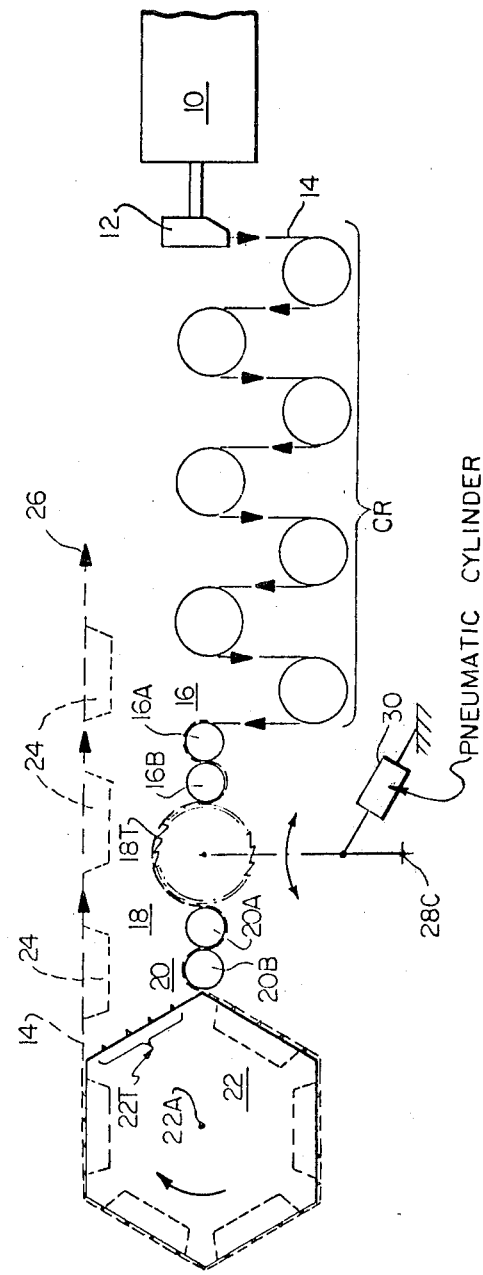
FIG. 2 is another embodiment of a continuous system of the present invention in which the extrudate is at a higher temperature than is considered optimum for orientation and in which a series of cooling rolls are provided for establishing the desirable orientation temperature downstream from the extruder.

In the event that the extruder 10 emits material from the die 12 which is at a higher temperature than the optimum one for imparting biaxial orientation to the material in the web 14, then the system schematically illustrated in FIG. 2 is utilized to bring the extrudate web 14 down to the proper orientation temperature. The embodiment of FIG. 2 also illustrates the use of another preferred embodiment of input and output roller assemblies to impart machine direction or longitudinal orientation to the extrudate web 14.

As illustrated in FIG. 2, the extruder 10 and the die 12 feed an extrudate web 14 first into a bank of cooling rolls CR which are provided, as is well-known in the art, with a suitable heat exchange medium and control therefor, or which simply provide the proper reach of web material 14 for a given temperature of extrusion to permit it to cool sufficiently in the ambient conditions of the process equipment, such that when it reaches the input roll assembly 16 it is at the proper temperature for orientation.

The input roller assembly 16 is illustrated as including a first roller 16A and a second roller 16B which receives the web 14 in a serpentine path therebetween and which rolls 16A and 16B are driven at differential rotational velocities to impart a longitudinal or machine direction orientation or stretch to the web 14 prior to the engagement of the said web 14 with the teeth 18T of the transverse stretcher blade assembly 18.

Similarly to the input roller assembly 16, the output roll assembly 20 is shown as comprising first and second output rolls 20A and 20B extending downstream, in that order, from the transverse blade assembly 18 and which further includes the concept of driving these rollers at selectively differential rotational velocities to impart further longitudinal stretch, if desired, to the web 14 downstream of and subsequent to the impartation of transverse orientation thereto. The downstream output roller 20B is engaged with the periphery of the polygon mold wheel 22 such that in its rotation about the center 22A, the oriented web material 14 will be immediately placed upon the periphery of the mold wheel 22, the latter being provided with suitable gripping means such as serrations, vacuum orifices or the like, schematically shown as upstanding teeth 22T on one of the flats of the mold wheel 22 for piercing or otherwise securely engaging the web to hold it against a relaxation of the imparted orientation therein during the molding process on the periphery of the mold wheel 22.

As in FIG. 1, the web 14 is shown leaving the mold wheel 22 with formed products 74 therein heading back towards the direction of the extruder 10.

Figure 4:
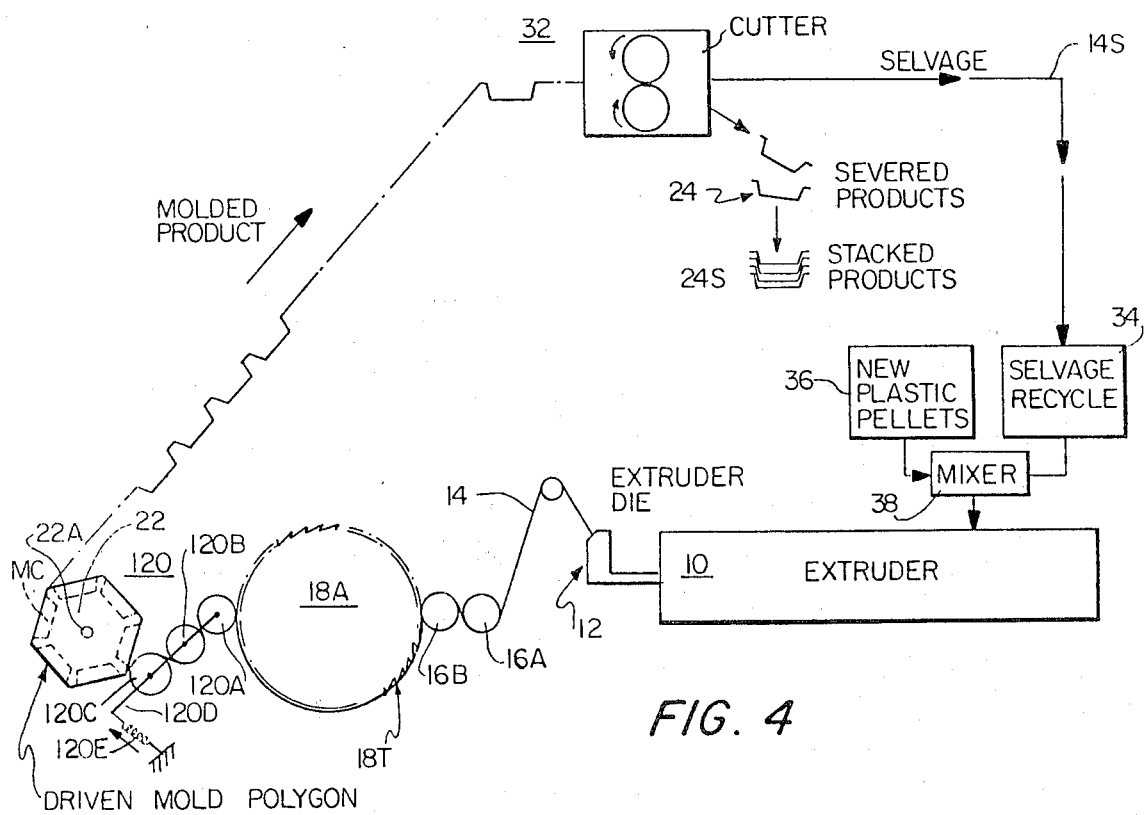
FIG. 4 is a schematic of a low inertia embodiment of the present invention.

In this context, reference is now made to FIG. 4 in which the molded products 24 traveling in the return direction 26 are delivered to a cutter means 32 which severs the molded products 24 from the selvage of the web 14 and causes the said severed products 24 to be stacked in a suitable product stack 24S which is schematically shown in FIG. 4.

While the severed products travel to a stack 24S, the selvage 14S travels to a selvage recycling means 34 which cooperates with a source of new plastic granules or pellets 36 to place both reground selvage and the pellets 36 into a mixer assembly 38 of a type well-known in the art to redirect both fresh raw material and recycled selvage into the extruder 10.

FIG. 4 also includes a low inertia embodiment of the present invention which will be more fully described at a later point herein. For the present, the foregoing description of FIG. 4 is to illustrate that the recycling of the selvage after separation of the selvage 14S from the products 14 is a common feature of all of the preferred embodiments of the present invention and is to be considered as included in the description of the embodiments of FIGS. 1 and 2.

Figure 3A:
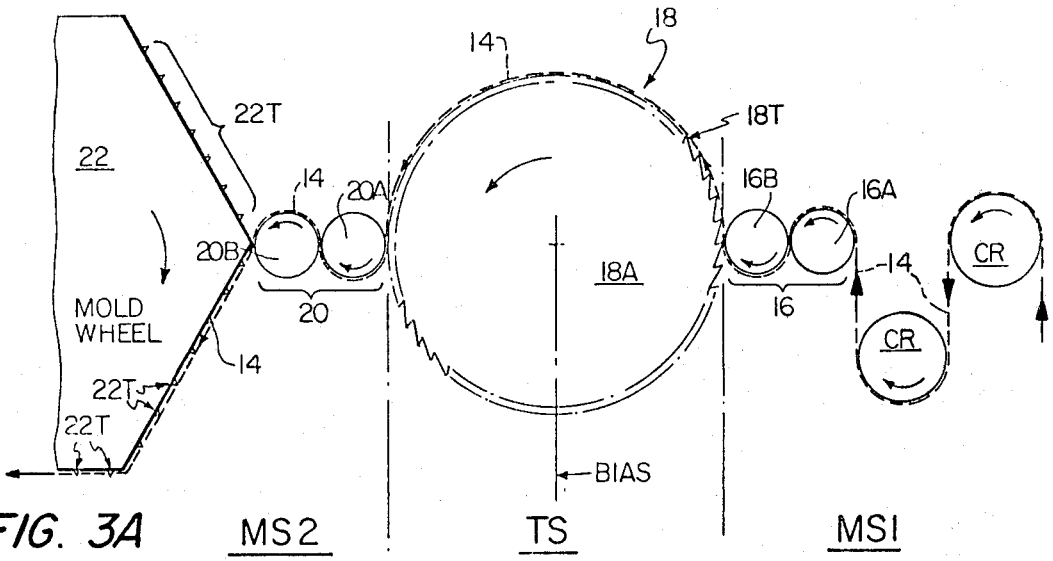
FIG. 3A is an enlarged schematic of the biaxial orientation apparatus of the system of FIG. 2 illustrating the several positions at which orientation can occur.

In order to fully explain at this point in time the orientation process in the biaxial mode, reference is now made to FIGS. 3A, 3B, 3C and 3D, with FIG. 3A being an enlarged partial schematic of the biaxial orientation portion of FIG. 2.

In practice, the longitudinal stretching or machine direction stretching or orientation can be carried out immediately before or immediately after the transverse stretching or half before or half after the said transverse stretching. Furthermore, any other ratio of initial machine direction stretch and final machine direction stretch is also feasible. The degree of transverse or longitudinal orientation can be varied to suit a particular product which may have depth or shape requiring less initial orientation of the sheeting in one or another direction. Therefore, the present invention provides a system which is very facile and variable with regard to unique and unusual molded shapes.

Figure 6:
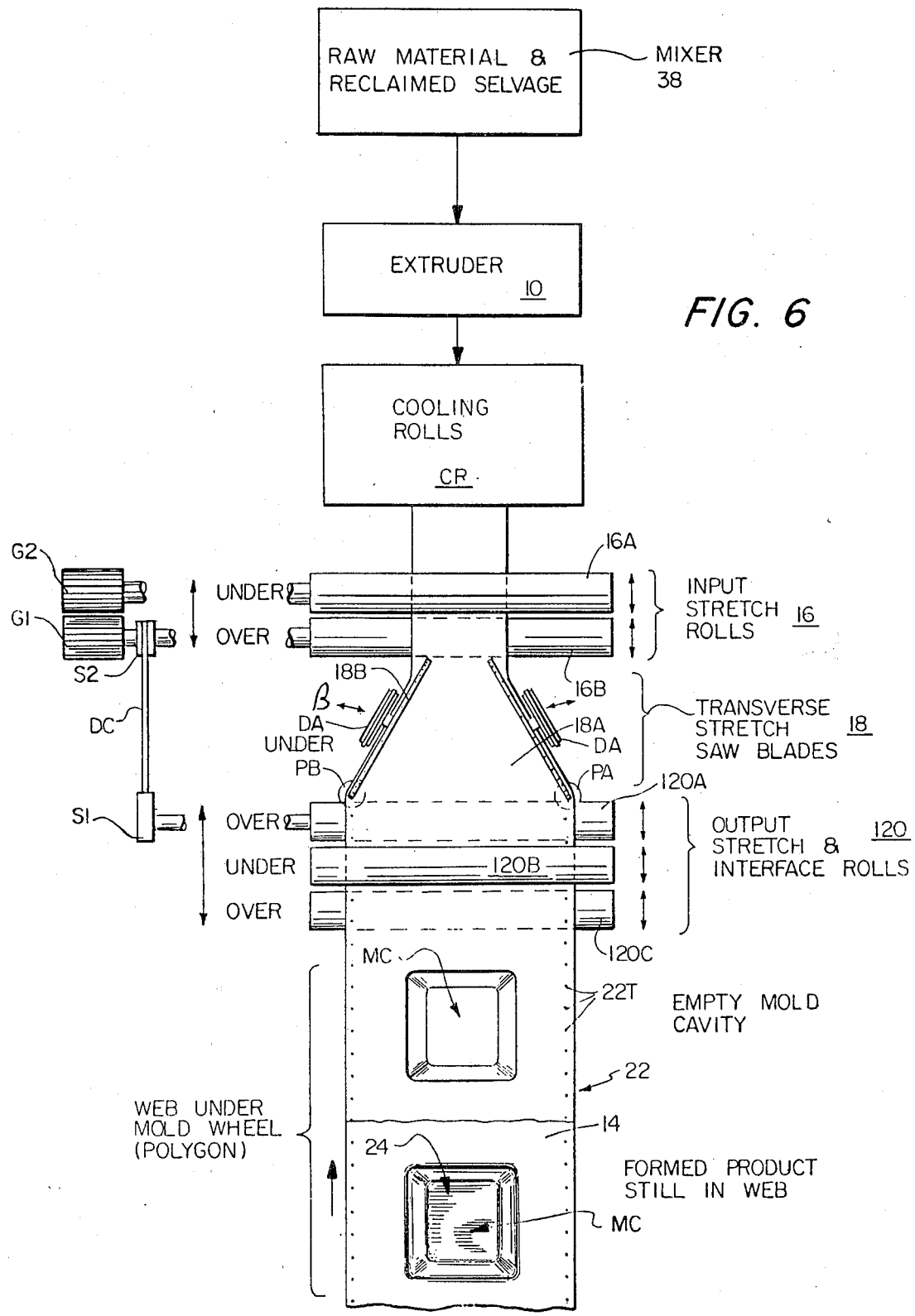
FIG. 6 is a top plan partial schematic of the embodiment of FIG. 4.

In the present invention, the amount of selvage which falls outside of the transverse stretcher blades 18A and 18B is the same as that amount of selvage which falls outside of the holding devices 22T about the periphery of the mold wheel 22. These holding devices 22T, as illustrated, for example, in FIG. 6, are along both peripheral edges of the mold wheel 22 which is shown in partial top plan view in FIG. 6.

In practice, the holding devices or gripping devices 22T about the periphery of the mold wheel can be made effective on the mold wheel station where the web 14 is initially engaged and where molding initially takes place and can be deactivated or rendered ineffective on the stripping or molded product removal side or stations of the mold wheel polygon 22 such that the stripping of the finished products 24 and selvage 14S from the mold wheel 22 is facilitated.

In FIGS. 3A-3D, the zone subtended in the web 14 by the transverse stretcher assembly 18 is identified as a transverse stretching zone TS which is preceeded on the upstream side by a machine stretch zone MS1 and on the downstream side by a machine stretch zone MS2.

Figure 3B:
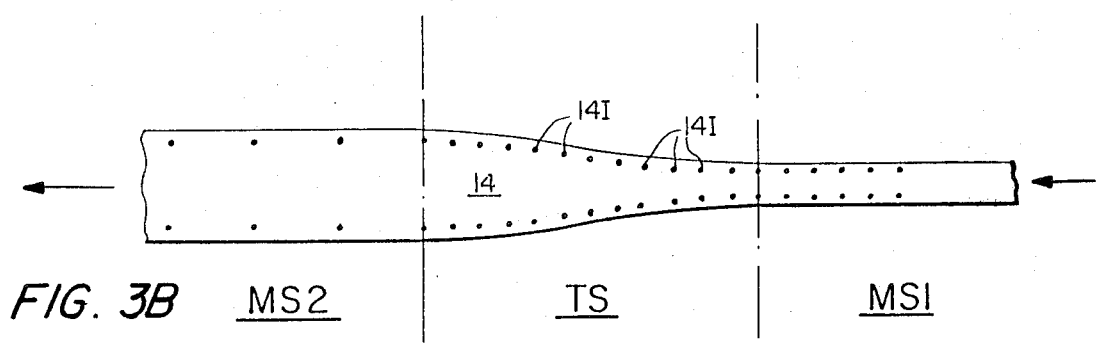
FIGS. 3B, 3C and 3D are schematic stretch diagrams showing the several modes of biaxial orientation of the extrudate which is possible with the present invention in correlation with the relative position of the extrudate in the orientation apparatus of FIG. 3A.

Referring now to FIG. 3B, it can be seen that all of the machine orientation or longitudinal stretch has been effectuated in the zone MS2 as indicated by the wider spacing between the edge adjacent dots 14I which are utilized to designate equal increments of unbiased web 14 in the initial spacing shown in the zone MS1 of FIG. 3B which is a totally unoriented configuration and spacing. This spacing is incremental in both the longitudinal and transverse directions of the web, i.e., the dots 14I define biaxial increments of the web 14.

Figure 3C:
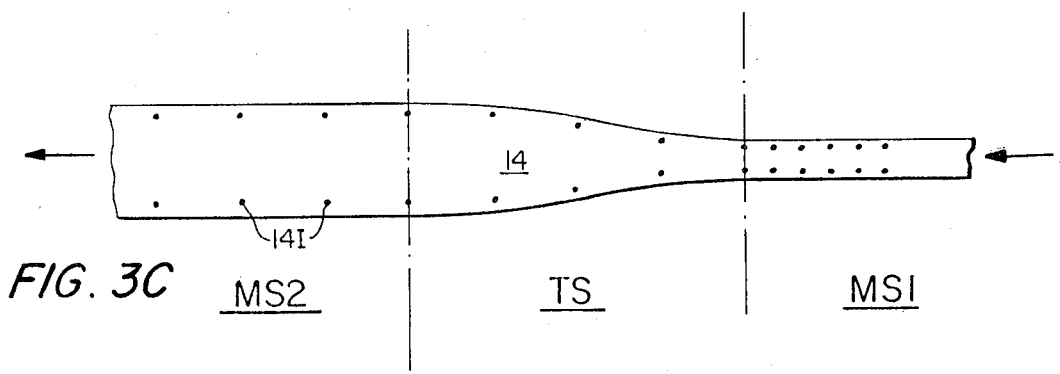

Referring next to FIG. 3C, it can be seen that the rotational velocity of the transverse stretcher blades 18A is such that the web travels faster in the transverse stretching zone TS and therefore has imparted to it both transverse and longitudinal stretch and has no additional longitudinal stretch imparted to it in the downstream or second machine stretch zone MS2. The zone MS1 upstream of the transverse stretching zone TS illustrates no biaxial orientation upstream of the transverse zone TS.

Figure 3D:
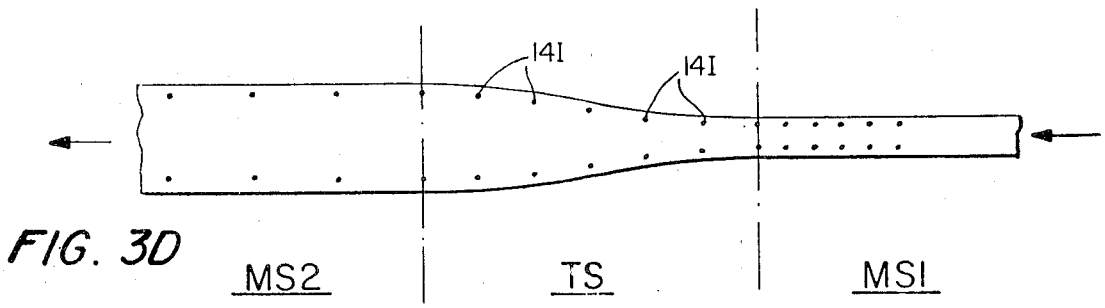

Referring next to FIG. 3D, it can be seen that in the initial upstream zone MS1, that no biaxial orientation is imparted to the web 14, that in the zone TS both transverse and partial machine direction stretch are imparted to the web 14 and in downstream zone MS2 additional longitudinal or machine direction stretch is imparted to the web 14.

The foregoing clearly illustrates the wide variety of longitudinal and transverse stretch means which can be effectuated with the present invention. In all cases, of course, the transverse stretching is achieved within the zone TS and not within the upstream and downstream zones MS1 and MS2, respectively.

If in the zone MS1 in either of the foregoing diagrams of FIGS. 3B, 3C or 3D, the dots 14I in the upstream zone MS1 were to vary in spacing longitudinally of the web 14, then that would be indicative of a differential peripheral velocity of the rollers 16A and 16B which would impart machine direction stretch to the web 14 in the upstream zone MS1.

Referring further to FIG. 3A, the diameter of the rolls 16A, 16B, 20A and 20B are kept as small as is consistent with minimizing the deflection of these rolls under load. Also, the distance between the rolls in the respective roll pairs 16 and 20 is preferably no greater than to allows for slight clearance of the web or extrudate 14 which minimizes the shrinkback which otherwise occurs as the material is transferred from one roll to another.

The surface speed of the second roll 16B is usually faster than the surface speed of the first roll 16A so as to achieve longitudinal stretch in the upstream area MS1 and preferably, the said surface speed of the roller 16B as compared to that of the roller 16A is such that about 50% of the longitudinal or machine direction orientation occurs in the transfer of material from the roller 16A onto the roller 16B.

Also, as shown in FIG. 3A, the teeth 18T on the transverse stretcher blade 18A are very close to the surface of the second roller 16B and the perimeter speed of the blades is preferably slightly faster than the surface speed of the roller 16B thereby making the transfer of material from one to the other more effective. The teeth 18T actually penetrate the edge of the web or strip 14 so as to hold the material securely as transverse stretching takes place due to the angular orientation of the blades 18A and 18B, the latter being best shown with reference to FIGS. 5A and 5B.

The third or initial output roller 20A is also positioned very close to the teeth 18T of the blades 18A and 18B so as to minimize shrinkback at this particular transfer point comprised by the interface between the said roll 20A and the blades 18A and 18B. The surface speed of the roller 20A is usually and preferably slightly faster than the perimeter speed of the transverse stretching blades 18A and 18B and the fourth roller 20B is maintained close to the third roller 20A in order to minimize shrinkback during the transfer from one roller to another. Usually, the fourth roll 20B is run faster than the third roller 20A with the preferred speed being such as to accomplish the remaining 50% of the longitudinal or machine direction orientation in the web 14. The web 14, as it leaves the fourth or interfacing roller 20B onto the mold wheel 22 is thus fully biaxially oriented.

As disclosed with reference to FIGS. 1 and 2, the entire orientation device 16-18-20 in the particular embodiments of FIGS. 1, 2 and 3A is pivoted about the pivot points 28C and a suitable means 30 such as a spring schematically shown in FIG. 1 or a pneumatic cylinder schematically shown in FIG. 2 is provided to bias the final output or interfacing roller 20B against the peripheral shoulders of the mold wheel 22 such that the teeth 22T on the mold wheel will avoid contact with the roller surface but will penetrate and retain the web 14 in its biaxially oriented condition over each face of the mold wheel 22 such that a uniform web is presented to each mold cavity MC therein.

All of the longitudinal stretching rollers 16A, 16B, 20A and 20B are preferably coated with flurocarbon such as Teflon to avoid sticking of the web 14 thereto. Also, such rollers are usually made with thin-walled steel tubes in order to minimize the heat retention capacity and heat transfer to the ends of the rollers. Therefore, in the area of contact with the web 14, the rolls reach about the same temperature as that of the web itself.

A low inertia orientation apparatus of the present invention will now be described with further reference to FIGS. 4, 5A, 5B and 6.

In this embodiment, the output rollers 20 of the previous embodiments are replaced by an output roller set 120 which is comprised of three rollers 120A, 120B and 120C mounted on a common frame 120D which is biased by suitable means 120E toward the mold wheel 22 such that the final output of interfacing roller 120C is engaged with the mold wheel 22 in a manner similar to that of the final roller 20B in the previous embodiments.

The biasing means 120E can be any suitable device such as a compression spring or a pneumatic spring or cylinder such as already described in reference to the embodiments of FIG. 1 and FIG. 2, respectively.

The common support 120D for the downstream output roller set 120 is pivoted on the center line of the upstream roller 120A of that set and the transverse stretching saw blades 18 and the input stretch rolls 16 are fixedly mounted in the embodiments of FIGS. 4 and 6 as opposed to being mounted for movement about a central point 28C such as previously described in FIGS. 1 and 2.

Thus, only the inertia of the three output stretching and interface rollers 120A–120C and the frame 120D on which these are mounted is involved in the interfacing of the biaxially oriented web 14 and the undulating peripheral surface of the rotating mold polygon 22. Through the use of three rollers, disproportionate elongation due to oscillation is avoided and a more uniformly elongated web 14 will result than would result with the use of two rollers. The gap between the three rollers 120A–120C is kept very small to avoid shrinkback of the now biaxially oriented web traversing these rolls. Because the inertia of this particular output stretch and interface roll means has been minimized, the mass and inertia of the remaining portions of the biaxial orientation equipment is not critical.

The drive means DA and DB on the transverse stretch saw blades 18A and 18B, respectively, and the nearest rollers thereto, namely, the upstream interface roller 16B and the downstream initial roller 120A are all driven preferably from a common drive motor through various drive belts or chains and the rollers 16B and 120A are illustrated in FIG. 6 as being driven by a common drive belt DC which engages drive pulleys or sprockets S1 and S2 mounted on the shafts of the rollers 120A and 16B, respectively.

Further, the roller 16B includes a passive output gearing G1 which is engaged with compatible gearing (of a predetermined ratio) G2 mounted on the shaft of the initial input roller 16A such that the differential speed between the rollers 16A and 16B can be effectuated from the same common drive means DC that drives both the rollers 16B and 120A.

Thus, the ratio of the gears G1 and G2 can be changed to vary the amount of longitudinal stretch achieved between the initial input rollers 16A and 16B.

The last two rolls 120B and 120C on the downstream side of the transverse stretcher blades 18 are not driven from the stretcher apparatus. The last output or interface roll 120C is driven by the surface speed of the mold wheel or polygon 22 with which it is in contact and this speed is established and selected to provide the proper longitudinal orientation when measured against the fixed speed of the initial output roll 120A. The middle roll 120B of the output roller group 120 merely idles and reaches a speed in between that of the other two rolls 120A and 120C of the set 120.

In order to maintain a constant dimensional relationship between the transverse stretch saw blades 18A and 18B and the initial output roller 120A, the blades 18A and 18B are pivoted at their downstream edge on the pivots PA and PB, respectively, rather than at the center of the said blades 18A and 18B. Therefore, the relationship between these blades 18A and 18B and the output roller 120A remains constant during adjustment of the blades between a direction parallel to the machine direction oriented at 45° with respect to the machine direction.

The second roller 16B and its companion input roll 16A in the input stretch roll set 16 move in and out to adjust to the position of the transverse stretch saw blades 18A and 18B depending upon the adjusted position of the latter. Suitable stop means or bosses are provided on the saw blade adjustment brackets to interact with the mounting of the various input rollers 16A and 16B to preclude engagement of the rolls with the saw blade but maintaining the desired immediate proximity thereof.

The material tension of the web 14 proceeding beneath the roller 16A back over the roller 16B and thence beneath the saw blades 18A and 18B is sufficient, since the web 14 initially approaches the roll 16A from above, to cause the roll 16A to track the movements of the roll 16B and thereby maintain the desired minimum spacing by way of the material tension in the web 14.

Suitable means are also provided within the mounting bracket 120D of the output roll set 120 to provide for moving the three rollers 120A, 120B and 120C apart and back together again to provide for the threading of material therethrough at the beginning of an extrusion and oriention and molding cycle and then placing the rollers under a sufficient bias to provide a predetermined minimum spacing and pressure thereon such as by small air cylinders or the like, all of which is within the purview of one of ordinary skill in the art.

If the molded products 24 are desired to be nine inch plates having a material thickness on the order of 0.010 inches, a stretch ratio of about 3 to 1 is established for both the transverse and longitudinal orientation of the web 14, by way of an exemplary process parameter. In this case, the die opening would be on the order of 0.090 inches of web thickness and 3 inches in width plus perhaps a one-quarter inch allowance for selvage. The polystyrene resin which is to be converted to OPS resin would be extruded at preferably, 425° F. The extrudate would be cooled to about 280° F. by the cooling rolls CR before entering the initial rollers 16A and 16B of the stretcher apparatus of the present invention.

At an output rate of approximately 600 pounds of web material per hour, the speed of the extrudate would be about 90 feet per minute before entering the initial rolls 16 of the stretcher assembly and about 270 feet per minute leaving the last or interfacing roller 120C of the stretcher assembly. This 270 foot per minute speed would match the speed of the mold surface or mold polygon 22.

Fifty percent of the longitudinal orientation in the web 14 would probably be accomplished between the rollers 16A and 16B, all of the transverse orientation between the transverse stretcher blades 18A and 18B and the remaining 50% of the longitudinal orientation established between the roll 120A at the input of the group 120 and the roll 120C interfacing the biaxially oriented web material with the mold polygon 22.

The mold polygon or mold wheel 22, for example, might have 15 mold cavities MC and would be in that event, four feet in diameter. The ratio of selvage to finished product would be about 50—50. The plate 24 would weigh about 10 grams and 324 plates per minute would be produced at a mold wheel speed of about 21 rpm.

In achieving the transverse orientation with the blades 18A and 18B, these blades would be gapped at about three and one-eighth inches on their upstream side and about nine and three-eighth inches on their downstream side to effectuate the three for one transverse stretch desired.

Accordingly, it can be seen that a continuous process with a relatively high speed of production and high quality control with a low inertia apparatus is readily effectuated by the embodiments of FIGS. 4, 5A, 5B and 6.

It should be understood that the METHOD AND APPARATUS FOR THE CONTINUOUS FORMATION OF BIAXIALLY ORIENTED THERMOPLASTIC MATERIALS AND FORMING ARTICLES THEREFROM IN A CONTINUOUS PROCESS of the present invention may be modified as would occur to one of ordinary skill in the art without departing from the spirit and scoe of the present invention.

It is claimed:

1. An apparatus for continuously manufacturing oriented thermoplastic molded articles from granulated and comminuted polystyrene material comprising:
   extruder means for assimilating raw thermoplastic material and extruding it into a strip;
   charging means for providing granulated and comminuted thermoplastic material to said extruder means;
   regulating means controlling the temperature of said extruded strip to a desired optimum orientation temperature;
   orientation means including input and output roller means for longitudinally advancing said strip and divergent rotary blade means intermediate said input and output roller means for imparting transverse stretch to said strip;
   said input and output roller means and said divergent blade means having selected differential peripheral speeds therebetween to longitudinally stretch said strip to thereby biaxially orient said strip in conjunction with said divergent blade means;
   polygonal rotary mold means having a mold cavity in each peripheral segment thereof;
   said periphery of said mold means being juxtaposed with said output roller means;
   said output roller means being constrained to closely follow said periphery of said mold means;
   means continuously constraining said strip into the shape of said mold cavities while fixing said strip in its biaxially oriented state;

means continuously stripping the now fixed molded products and selvage from said mold means and separating said products from said selvage; and means continuously comminuting and recycling said selvage into said extruder means through said charging means, wherein the orientation means, divergent rotating blade means and polygonal rotary mold cooperate so that the stress placed in the polystyrene material by said biaxial orientation is substantially maintained from the initiation of said orientation to the forming of the molded articles therein.

2. The apparatus of claim 1 wherein said output roller means is mounted independently of the remainder of said orientation means to minimize inertial stresses between said orientation means and said mold means.

3. The apparatus of claim 2, wherein said output roller means comprises:

elongated bracket means extending longitudinally of said strip and pivotally mounted on a transverse axis at its upstream end for rotation toward and away from said polygonal mold means;

a plurality of parallel rollers mounted for rotation in said bracket means transversely of said strip and mutually parallel with the peripheral surface of said polygonal mold means;

said strip being threaded in a serpentine manner through said roller means;

a downstream roller in said plurality of rollers, constrained by said bracket means to follow the said peripheral surface of said mold means throughout its rotation and resulting undulations and driven by the latter at a like peripheral speed, thereby transferring said strip directly and conformally onto said peripheral surface; and an upstream roller in said plurality of rollers initially receiving said strip on its peripheral surface in a transversely oriented condition and having an axis of rotation substantially coincident with said transverse pivotal axis of said bracket means.

4. The apparatus of claim 3, wherein said upstream roller includes drive means maintaining a differential peripheral speed between said upstream and downstream rollers to impart longitudinal orientation to said strip in said output roller means.

5. The apparatus of claim 3 wherein the output roller means further includes an odd number of intermediate rollers between said upstream and downstream rollers.

6. The apparatus of claim 5, wherein said upstream roller includes drive means maintaining a differential peripheral speed between said upstream and downstream rollers to impart longitudinal orientation to said strip in said output roller means.

7. An apparatus for interfacing a web of continuously formed and biaxially oriented thermoplastic material with a continuously undulating and rotating peripheral surface to minimize resulting longitudinal stresses in said web and conform a surface of said web with said peripheral surface, said web being in continuous longitudinal motion, said apparatus comprising:

elongated bracket means extending longitudinally of said web and pivotally mounted on a transverse axis at its upstream end for rotation toward and away from said peripheral surface;

a plurality of parallel roller means mounted for rotation in said bracket means transversely of said web and mutually parallel with said peripheral surface;

said web being threaded in a serpentine manner through said roller means;

downstream roller means in said plurality of roller means, constrained by said bracket means to follow said peripheral surface throughout its undulations and driven by the latter at a like peripheral speed, transferring said web directly onto said peripheral surface; and upstream roller means in said plurality of roller means initially receiving said web on its peripheral surface and having an axis of rotation substantially coincident with the said transverse pivotal axis of said bracket means wherein said plurality of roller means and said undulating rotating peripheral surface cooperate so that the stress placed in the thermoplastic material by the orientation is maintained from the initiation of said orientation until products are formed therein on said rotating peripheral surface.

8. The apparatus of claim 7, wherein said upstream roller means includes drive means for maintaining a differential perhipheral speed between said upstream and downstream roller means to impart longitudinal orientation to said web in said interfacing apparatus.

9. An apparatus for interfacing a web of continuously formed and biaxially oriented thermoplastic material with a continuously undulating and rotating peripheral surface to minimize resulting longitudinal stresses in said web and conform a surface of said web with said peripheral surface, said web being in continuous longitudinal motion, said apparatus comprising:

elongated bracket means extending longitudinally of said web and pivotally mounted on a transverse axis at its upstream end for rotation toward and away from said peripheral surface;

a plurality of parallel roller means mounted for rotation in said bracket means transversely of said web and mutually parallel with said peripheral surface;

said web being threaded in a serpentine manner through said roller means;

downstream roller means in said plurality of roller means, constrained by said bracket means to follow said peripheral surface throughout its undulations and driven by the latter at a like peripheral speed, transferring said web directly into said peripheral surface; and upstream roller means in said plurality of roller means initially receiving said web on its peripheral surface and having an axis of rotation substantially coincident with the said transverse pivotal axis of said bracket means; and an odd number of intermediate roller means between said upstream and downstream roller means wherein said plurality of roller means and said undulating rotating peripheral surface cooperate so that the stressed placed in the thermoplastic material by the orientation is maintained from the initiation of said orientation until products are formed therein on said rotating peripheral surface.

10. The invention of claim 9, wherein said upstream roller means includes drive means maintaining a differential peripheral speed between said upstream and downstream roller means to impart longitudinal orientation to said web in said interfacing means.

11. An apparatus for continuously orienting and transferring a continuous web of thermoplastic material conformally onto the periphery of a polygonal rotating mold from an extruder, said apparatus comprising:

web receiving and advancing means ingesting said web;

web stretching means downstream of said web receiving means for next receiving said web and imparting at least a lateral stretch to said web and advancing same toward a said polygonal rotary mold; and web transfer means mounted immediately downstream from said web stretching means in peripheral surface following relationship with said polygonal rotating mold for receiving the laterally stretched web from said web stretching means and conformally juxtaposing said stretched web with said peripheral surface of said rotating mold;

at least one of said web receiving and advancing means and said web transfer means imparting a longitudinal stretch to said web to impart biaxial orientation thereto prior to its conformal juxtaposition with said peripheral surface of said rotating mold, wherein the web receiving and advancing means, the web stretching means, the web transfer means, and the polygonal rotating mold cooperate so that the stress placed in the thermoplastic material by said biaxial orientation is substantially maintained from the initiation of said orientation to the forming of the products therein on the polygonal rotating mold.

12. The appartus of claim 11, wherein said web receiving and advancing means comprise first and second roller means and means driving said roller means at differential peripheral velocities to impart longitudinal stretch to said web.

13. The apparatus of claim 11, wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

14. The apparatus of claim 4, wherein said web transfer means comprises:

first, second and third roller means mounted transversely of said web with said second roller commonly adjacent the other said rollers; and a common frame mounting said roller means for rotation therein on parallel axes of rotation with said first roller immediately adjacent said web stretching means and said third roller in rolling juxtaposition with said peripheral surface of said rotating mold with said oriented web therebetween.

15. The apparatus of claim 11, wherein said web receiving and advancing means comprise first and second roller means and means driving said roller means at differential peripheral velocities to impart longitudinal stretch to said web; and wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

16. The apparatus of claim 11, wherein said web receiving and advancing means comprise first and second roller means and means driving said roller means at differential peripheral velocities to impart longitudinal stretch to said web; and wherein said web transfer means comprises:

first, second and third roller means mounted transversely of said web with said second roller commonly adjacent the other said rollers; and a common frame mounting said roller means for rotation therein on parallel axes of rotation with said first roller immediately adjacent said web stretching means and said third roller in rolling juxtaposition with said peripheral surface of said rotating mold with said oriented web therebetween.

17. The apparatus of claim 11, wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs; and wherein said web transfer means comprises:

first, second and third roller means mounted transversely of said web with said second roller commonly adjacent the other said rollers; and a common frame mounting said roller means for rotation therein on parallel axes of rotation with said first roller immediately adjacent said web stretching means and said third roller in rolling juxtaposition with said peripheral surface of said rotating mold with said oriented web therebetween.

18. The apparatus of claim 4, wherein said web receiving and advancing means comprise first and second roller means and means driving said roller means at differential peripheral velocities to impart longitudinal stretch to said web;

wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs; and wherein said web transfer means comprises:

first, second and third roller means mounted transversely of said web with said second roller commonly adjacent the other said rollers; and a common frame mounting said roller means for rotation therein on parallel axes of rotation with said first roller immediately adjacent said web stretching means and said third roller in rolling juxtaposition with said peripheral surface of said rotating mold with said oriented web therebetween.

19. The apparatus of claim 11, wherein said web transfer means comprises an odd number of three or more roller means mounted transversely of said web with said roller means parallel and adjacent for receiving said web on the peripheral surfaces thereof in a serpentine path;

a common frame mounting said roller means for rotation therein with an upstream roller means immediately adjacent said web stretching means and a downstream roller means in rolling juxtaposition with said peripheral surface of said rotating mold; and the remaining odd number of roller means being intermediate said upstream and downstream roller means for transporting said oriented web therebetween in said serpentine path.

20. The apparatus of claim 19, wherein said web receiving and advancing means comprise first and second roller means and means driving said roller means at differential peripheral velocities to impart longitudinal stretch to said web.

21. The apparatus of claim 19, wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

22. The apparatus of claim 19, wherein, said web receiving and advancing means comprise first and second roller means and means driving said roller means at differential peripheral velocities to impart longitudinal stretch to said web; and
   wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

23. The apparatus of claim 11 wherein the web transfer means is mounted substantially independent from the web stretching means and wherein the cooperation of said web receiving and advancing means, the web stretching means, the web transfer means and the polygonal rotating mold minimize inertial stresses imparted to said web.

24. The apparatus of claim 23, wherein said web receiving and advancing means comprise first and second roller means and means driving said roller means at differential peripheral velocities to impart longitudinal stretch to said web.

25. The apparatus of claim 23, wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

26. The apparatus of claim 23, wherein said web transfer means comprises:
   first, second and third roller means mounted transversely of said web with said second roller commonly adjacent the other said rollers;
   a common frame mounting said roller means therein on parallel axes of rotation with said first roller immediately adjacent said web stretching means and said third roller in rolling juxtaposition with said peripheral surface of said rotating mold with said oriented web therebetween; and
   means mounting said common frame for rotation on the axis of rotation of said first roller.

27. The apparatus of claim 23, wherein said web receiving and advancing means comprise first and second roller means and means driving said roller means at differential peripheral velocities to impart longitudinal stretch to said web; and
   wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

28. The apparatus of claim 23, wherein said web receiving and advancing means comprise first and second roller means and means driving said roller means at differential peripheral velocities to impart longitudinal stretch to said web; and
   wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs; and
   wherein said web transfer means comprises:
      first, second and third roller means mounted transversely of said web with said second roller commonly adjacent the other said rollers;
      a common frame mounting said roller means for rotation therein on parallel axes of rotation with said first roller immediately adjacent said web stretching means and said third roller in rolling juxtaposition with said peripheral surface of said rotating mold with said oriented web therebetween; and
      means mounting said common frame for rotation on the axis of rotation of said first roller.

29. The apparatus of claim 23, wherein said web receiving and advancing means comprise first and second roller means and means driving said roller means at differential peripheral velocities to impart longitudinal stretch to said web; and
   wherein said web transfer means comprises:
      first, second and third roller means mounted transversely of said web with said second roller commonly adjacent the other said rollers;
      a common frame mounting said roller means for rotation therein on parallel axes of rotation with said first roller immediately adjacent said web stretching means and said third roller in rolling juxtaposition with said peripheral surface of said rotating mold with said oriented web therebetween; and
      means mounting said common frame for rotation on the axis of rotation of said first roller.

30. The apparatus of claim 29, wherein said web stretching means comprises a pair of rotating discs, each disc having peripherally disposed teeth engaging a respective edge of said web when first received therein and said discs being divergently oriented in a downstream sense such that said teeth constrain said web to be stretched to a width commensurate with the divergence of said discs.

* * * * *